United States Patent [19]
Jang

[11] Patent Number: 5,997,437
[45] Date of Patent: Dec. 7, 1999

[54] PRESSURE SETTING VALVE AND HYDRAULIC CONTROL SYSTEM HAVING THE SAME FOR AN AUTOMATIC TRANSMISSION

[75] Inventor: Jaeduck Jang, Kyungki-do, Rep. of Korea

[73] Assignee: Hyundai Motor Company, Seoul, Rep. of Korea

[21] Appl. No.: 09/001,005

[22] Filed: Dec. 30, 1997

[51] Int. Cl.$^6$ .................................................. F16H 61/00
[52] U.S. Cl. ...................... 477/156; 477/158; 137/625.64
[58] Field of Search .................. 477/143, 151, 477/153, 155, 156, 158, 160, 161; 137/625.64

[56] References Cited

U.S. PATENT DOCUMENTS

| | | | |
|---|---|---|---|
| 4,056,019 | 11/1977 | Ahlen | 475/42 X |
| 4,078,475 | 3/1978 | Fillion | 137/87 X |
| 4,107,776 | 8/1978 | Beale | 701/54 X |
| 4,176,564 | 12/1979 | Ahlen et al. | 475/48 |
| 4,200,175 | 4/1980 | Dick | 477/175 |
| 4,347,044 | 8/1982 | Ahlen et al. | 475/137 X |
| 4,495,767 | 1/1985 | Akiyama et al. | 477/184 X |
| 4,585,030 | 4/1986 | Fox | 137/625.64 |
| 5,079,971 | 1/1992 | Yoshimura et al. | 477/161 X |
| 5,658,218 | 8/1997 | Jang et al. | 477/158 X |

*Primary Examiner*—Khoi Q. Ta

[57] ABSTRACT

The hydraulic control system is used in automatic transmissions having a plurality of friction elements associated with respective transmission speeds; a hydraulic fluid source; a line pressure controller for regulating hydraulic pressure supplied from the fluid source to line pressure; a range controller for selectively supplying hydraulic pressure from the line pressure control device; a shift controller for supplying hydraulic pressure from the range controller to lines corresponding to the respective transmission speeds by control of a transmission control unit; a hydraulic pressure controller for converting hydraulic pressure from the range controller to operational pressure operating the friction elements; and a hydraulic pressure distributor for determining a hydraulic flow path corresponding to the respective transmission speeds according to the hydraulic pressure from the shift controller, and for distributing the operational pressure to each friction element in accordance with that determination. The line pressure controller includes a line pressure regulating valve for regulating hydraulic pressure from the hydraulic fluid source to line pressure; and a pressure setting valve for compensating line pressure change to maintain the line pressure to a predetermined level.

3 Claims, 3 Drawing Sheets

PRESSURE SETTING VALVE AND HYDRAULIC CONTROL SYSTEM HAVING THE SAME FOR AN AUTOMATIC TRANSMISSION

FIELD OF THE INVENTION

The present invention relates to a hydraulic control system used in an automatic transmission for a vehicle, in particularly, the invention relates to an line pressure controller for regulating line pressure in the hydraulic control system.

BACKGROUND OF THE INVENTION

Generally, a conventional automatic transmission used in vehicles include a torque converter, a multi-stage gear shift mechanism connected to the torque converter, and a plurality of friction elements actuated by hydraulic pressure for selecting one of the gear stages of the gear shift mechanism.

A hydraulic control system for the automatic transmission operates by the selective supply of hydraulic pressure, the flow of which is generated by a hydraulic pump, to each friction element (for engagement or disengagement of the same) by a plurality of control valves such that shifting can be realized automatically and appropriate to the driving state of the vehicle.

Such hydraulic control system generally comprises a hydraulic fluid source, a line pressure controller for regulating hydraulic pressure supplied from the fluid source to line pressure, a range controller for selectively supplying hydraulic pressure from the line pressure controller, a shift controller for supplying hydraulic pressure from the range controller to lines corresponding to the respective transmission speeds by control of a transmission control unit (TCU), a hydraulic pressure controller for converting hydraulic pressure from the range controller to operational pressure operating the friction elements, and a hydraulic pressure distributor for determining a hydraulic flow path corresponding to the respective transmission speeds according to the hydraulic pressure from the shift controller and suitably distributing the operational pressure to each friction element.

Namely, automatic shifting is realized by selectively operating the friction elements through hydraulic pressure controlled by the above controllers in accordance with a driving state of the vehicles and engine throttle opening.

Referring to FIG. 1, there is shown a hydraulic circuit diagram of a conventional hydraulic control system. The hydraulic control system includes a torque converter 2 for transmitting power from an engine to the transmission, a damper clutch control valve 4 for controlling a damper clutch mounted in the torque converter 2 to increase power transmitting efficiency, a line pressure regulating valve 8 for regulating hydraulic pressure from a fluid pump 6, and a reducing valve 10 for supplying reduced hydraulic pressure to solenoid valves S1 and S4, and the damper clutch control valve 4.

A manual valve 12 receives line pressure from the fluid pump 6 such that the line pressure is supplied to the line pressure regulating valve 8 and a shift control valve 14.

The shift control valve 14 selectively supplies hydraulic pressure from the manual valve 12 to each friction element such as a front clutch 24, a rear clutch 26, a low/reverse brake 28, an end clutch 30, and a kickdown servo 32 through control of the hydraulic pressure distributor having a plurality of spool valves such as a 1-2 shift valve 16, an end clutch valve 18, 2-3/4-3 shift valve 20, and a rear clutch valve 22.

The manual valve 12 is connected to a N-D control valve 34 for reducing shift shock when port conversion of the manual valve from a neutral N range to a drive D range, through a first speed line L1. Further, the N-D control valve 34 is connected to a pressure control valve 36 which controls hydraulic pressure in the first speed line L1 and supplies the controlled pressure to the 1-2 shift valve 16 via the N-D control valve 34 when in second, third and fourth speed.

Between the manual valve 12 and the 1-2 shift valve 16 is provided a N-R control valve 38 for reducing shift shock when port conversion of the manual valve 12 from the neutral N range to a reverse R range such that the N-R control valve 38 supplies hydraulic pressure from the manual valve 12 to the low/reverse brake 28 via the 1-2 shift valve 16.

The shift control valve 14 supplies hydraulic pressure to the 1-2 shift control valve 16 through a second speed line L2 to control a valve spool of the 1-2 shift valve 16. Further, the shift control valve 14 supplies hydraulic pressure to the 2-3/4-3 shift valve 20 through a third speed line L3 to control a valve spool of the 2-3/4-3 shift valve 20. Simultaneously, the hydraulic pressure in the third line L3 is supplied to the end clutch 30 via the end clutch valve 18.

Further, the shift control valve 14 supplies hydraulic pressure to the rear clutch valve 22 through a fourth speed line L4 to control a valve spool of the same. Simultaneously, the hydraulic pressure in the fourth speed line L4 is supplied to the end clutch 30 via the end clutch valve 18.

Meanwhile, between the line pressure regulating valve 8 and the damper clutch control valve 4 is provided a torque converter control valve 39. Reference numerals S1, S2, S3, and S4 which have not yet been described are solenoid valves ON/OFF or duty controlled by a transmission control unit (TCU).

In such a hydraulic control system, line pressure is regulated by three stages; parking range "P", drive range "D", and reverse range "R". In the middle of regulating line pressure, what is most important is to maintain the line pressure to a uniform level when in the drive "D" range.

In such drive "D" range state, when fluid flowing in the automatic transmission has a high temperature or RPM of the engine is low such that amount of fluid supplied from the fluid pump 6 is insufficient, a phenomena in which line pressure is reduced occurs.

Further, when a shift process starts to proceed or when standby friction elements start to operate, hydraulic pressure is temporarily reduced such that hydraulic pressure is not uniform. Accordingly, shift quality is reduced, too.

SUMMARY OF THE INVENTION

The present invention has been made in an effort to solve the above problems.

It is an object of the present invention to provide a hydraulic control system for automatic transmissions including a line pressure controller for preventing line pressure from being reduced to maintain line pressure to a predetermined level such that shift quality is improved.

To achieve the above object, the present invention provides a hydraulic control system used in automatic transmissions including a plurality of friction elements associated with respective transmission speeds, the hydraulic control system comprising:

a hydraulic fluid source;

line pressure control means for regulating hydraulic pressure supplied from the fluid source to line pressure;

range control means for selectively supplying hydraulic pressure from the line pressure control means;

shift control means for supplying hydraulic pressure from the range control means to lines corresponding to the respective transmission speeds by control of a transmission control unit;

hydraulic pressure control means for converting hydraulic pressure from the range control means to operational pressure operating the friction elements; and hydraulic pressure distributing means for determining a hydraulic flow path corresponding to the respective transmission speeds according to the hydraulic pressure from the shift control means, and suitably distributing the operational pressure to each friction element:

wherein the line pressure control means includes a line pressure regulating valve for regulating hydraulic pressure from the hydraulic fluid source to line pressure;

a pressure setting valve for compensating line pressure change to maintain the line pressure to a predetermined level.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same of like parts.

Figure 1:
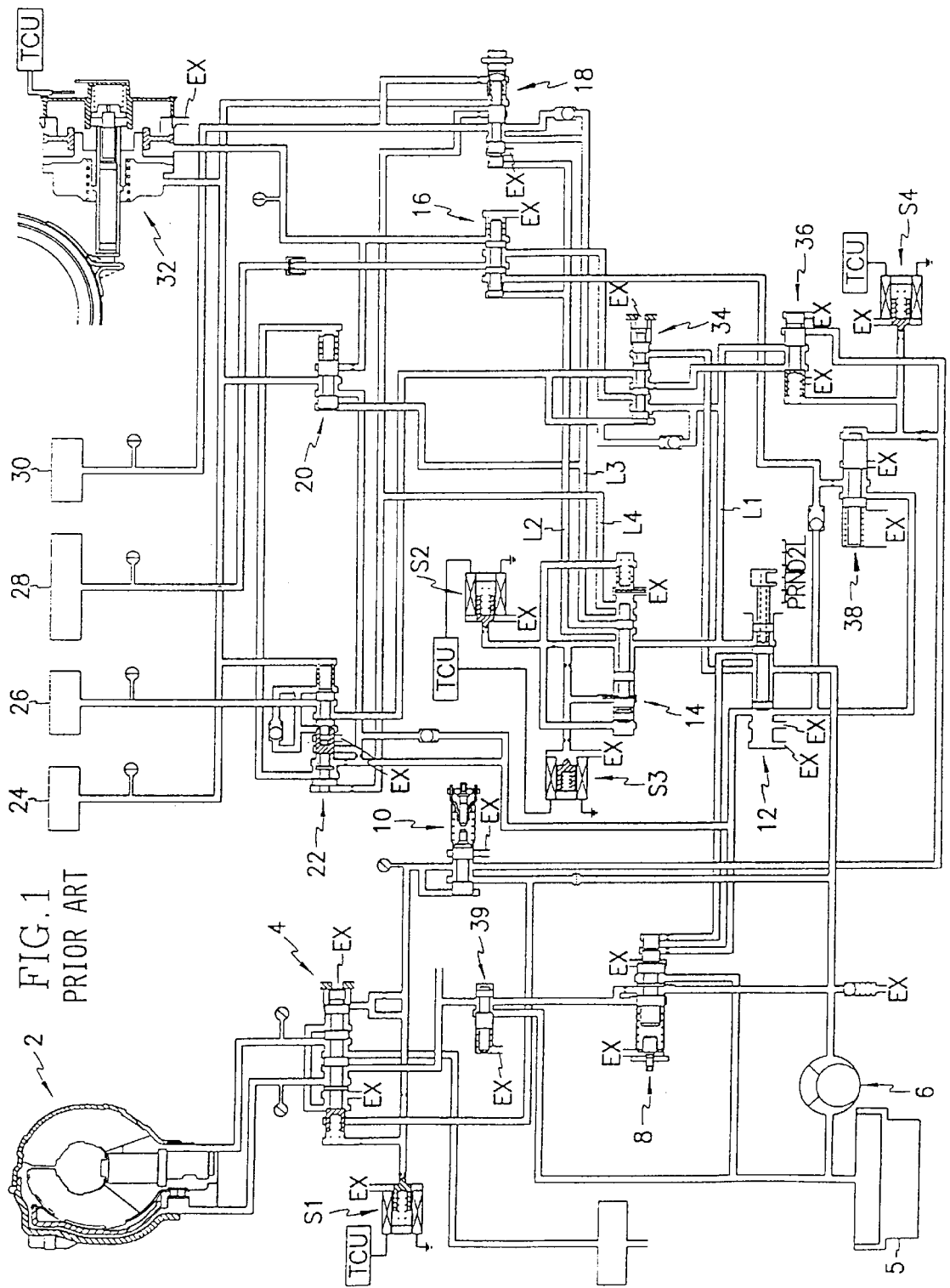
FIG. 1 is a hydraulic circuit diagram of a conventional hydraulic control system.
Figure 2:
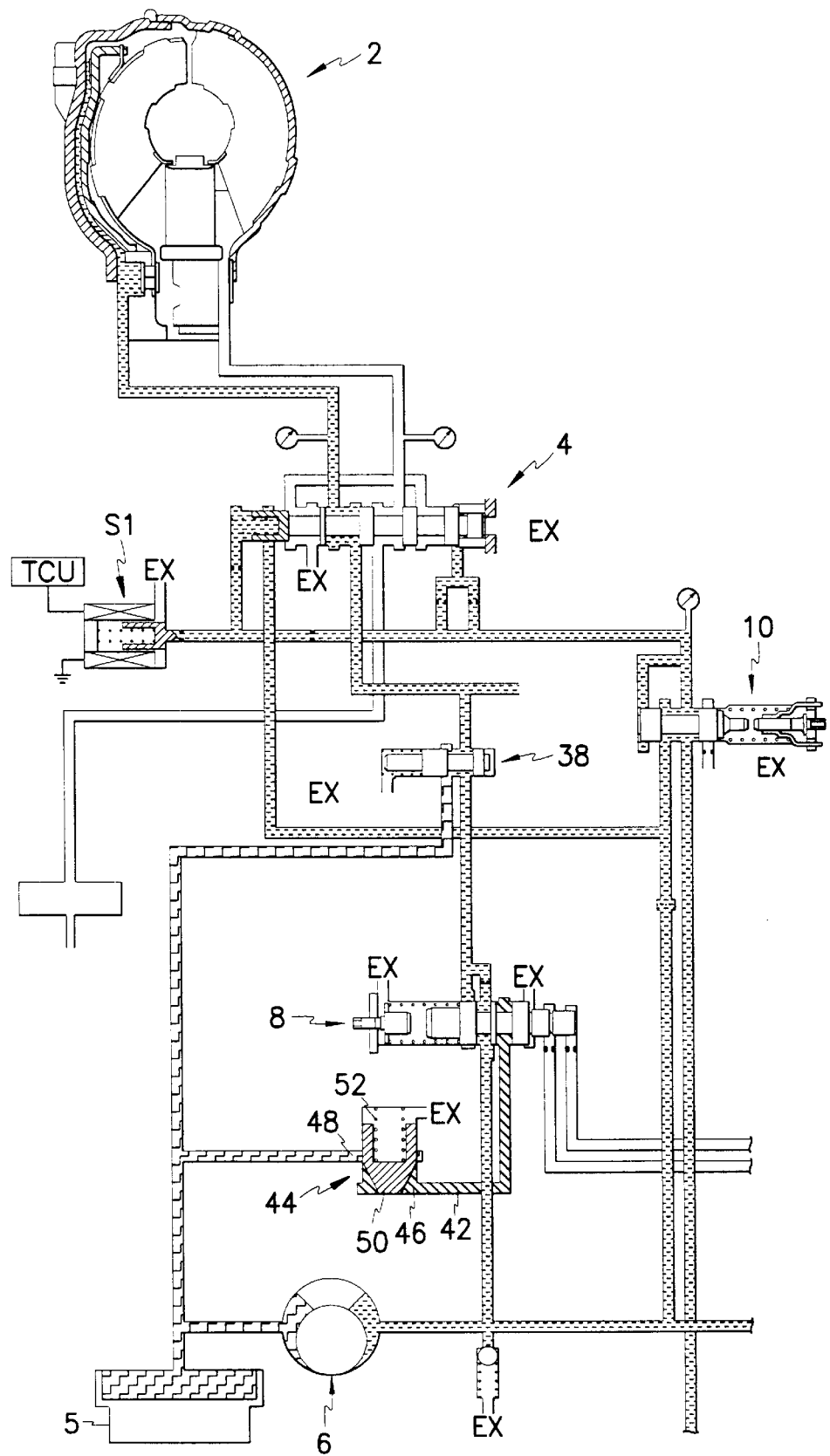
FIG. 2 is a partly enlarged hydraulic circuit diagram of a hydraulic control system according to a preferred embodiment of the present invention, in which a line pressure controller locating part is illustrated.
Figure 3:
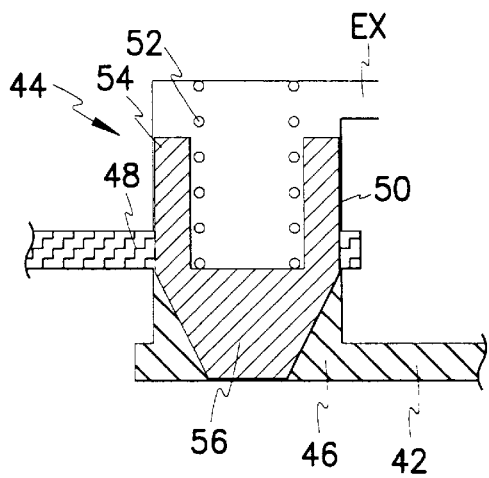
FIG. 3 is a sectional view of a pressure setting valve according to a preferred embodiment of the present invention, when the pressure setting valve is close.

FIG. 2 is a partly enlarged hydraulic circuit diagram of a hydraulic control system according to a preferred embodiment of the present invention, in which a line pressure controller locating part is illustrated and remaining parts are equal to prior art shown in FIG. 1. In the hydraulic circuit diagram according to the present invention, a pressure setting valve 44 is disposed on a return line 42 which hydraulic fluid from the line pressure regulating valve 8 is returned to a fluid pan 5 acting as a hydraulic fluid source. Namely, in the present invention, the line pressure controller having the line pressure regulating valve 8, the pressure setting valve 44, and a plurality of lines connecting each valve.

The pressure setting valve 44 accurately regulates line pressure by controlling return hydraulic fluid which returns to the fluid pan 5 from the line pressure regulating valve 44.

The pressure setting valve 44 has two ports 46 and 48. Among of the two ports, what is connected to the line pressure regulating valve 8 to receive the return hydraulic fluid from the line pressure regulating valve 8 is first port 46, the return hydraulic fluid passing through the pressure setting valve 44 is exhausted to the fluid pan 5 through second port 48.

Inside of a valve housing cavity defining a contour of the pressure setting valve 48, there is slidably mounted a valve spool 50 which communicate between the first port 46 and the second port 48. Further, the valve spool 50 includes a second port closing section 54 and a second port opening section 56 which extend downward from the second port closing section 54 and has a truncated conical-shape surface to enlarge a pressure acting area on which hydraulic fluid fed through the first port acts.

The valve spool 50 is biased downward by an elastic member 52 such that the second port closing section 54 cuts off the fluid flow between the first port 46 and the second port 48 in an initial state. Elastic force of the elastic member 52 is preferably set to be equal to line pressure in the drive "D" range.

By the pressure setting valve 44 structured in the above, when line pressure is reduced, the return hydraulic fluid is lower than the elastic force of the elastic member 52 such that the valve spool 50 is located below to cut off the fluid flow between the first port 46 and the second port 48. Accordingly, a phenomenon which line pressure is reduced is prevented.

Figure 4:
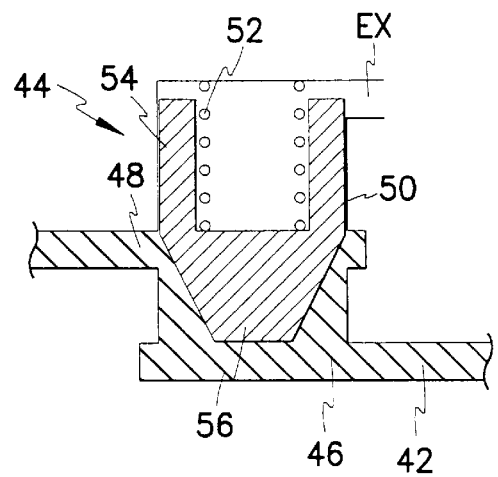
FIG. 4 is s a sectional view of a pressure setting valve according to a preferred embodiment of the present invention, when the pressure setting valve is open.

On the contrary, when line pressure is high than a regular state, as shown in FIG. 4, the return hydraulic pressure is higher that the elastic force of the elastic member 52 such that the valve spool 50 is pushed above to flow fluid between the first port 46 and the second port 48. Accordingly, the return hydraulic fluid is normally exhausted.

Figure 5:
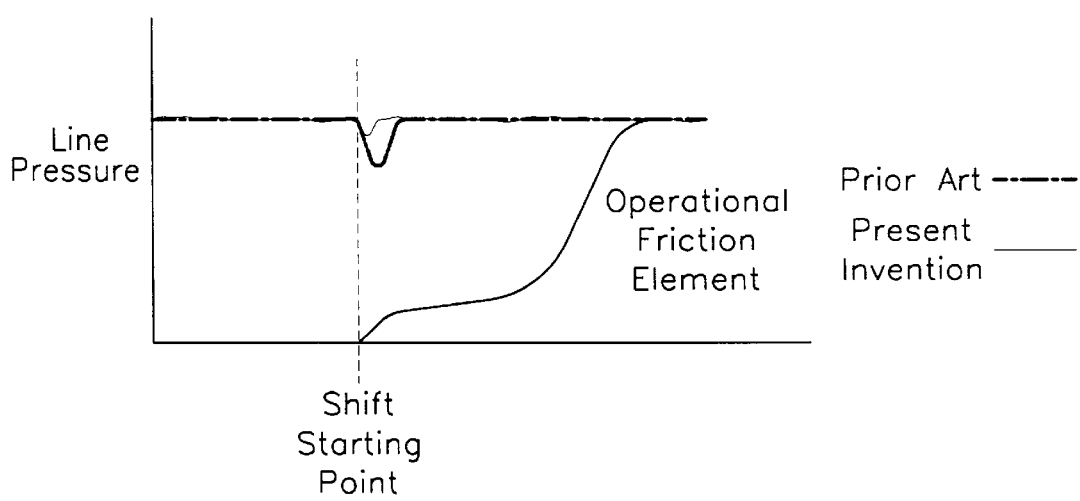
FIG. 5 is a graph illustrating line pressure change process of the present invention and prior art.

An efficiency of the present invention is illustrated as a graph shown in FIG. 5. In the prior art, line pressure, represented by the dotted line, is greatly reduced at the moment when shifting begins. However, in the present invention, line pressure, represented by the solid line, is relatively maintained in a uniform level.

In short, through the pressure setting valve 44 for regulating line pressure to prevent line pressure from being reduced, line pressure is maintained to a predetermined level to improve shift quality.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A hydraulic control system used in automatic transmissions including a plurality of friction elements associated with respective transmission speeds, the hydraulic control system comprising:

a hydraulic fluid source;

line pressure control means for regulating hydraulic pressure supplied from the fluid source to line pressure;

range control means for selectively supplying hydraulic pressure from the line pressure control means;

shift control means for supplying hydraulic pressure from the range control means to lines corresponding to the respective transmission speeds by control of a transmission control unit;

hydraulic pressure control means for converting hydraulic pressure from the range control means to operational pressure operating the friction elements; and hydraulic pressure distributing means for determining a hydraulic flow path corresponding to the respective transmission speeds according to the respective transmission speeds according to the hydraulic pressure from the shift control means, and distributing the operational pressure to ones of the friction elements based on said determination;

wherein the line pressure control means includes, line pressure regulating valve for regulating hydraulic pressure from the hydraulic fluid source to line pressure; and a pressure setting valve for compensating line pressure change to maintain the line pressure to a predetermined level, the pressure setting valve including, a valve housing cavity including a first port connected to the line pressure regulating valve and a second port connected to the hydraulic fluid source, a valve spool slidably disposed within the valve housing cavity to selectively open the second port, said valve spool including a second port closing section and a second port opening section, which extends downward from the second port closing section and has a truncated conical-shape surface to enlarge a pressure acting area on which hydraulic fluid fed through the first port acts, and an elastic member biasing the valve spool to the first port side of the valve housing cavity.

2. The hydraulic control system of claim 1, wherein elastic force of said elastic member is set to be equal to line pressure formed in a drive "D" range.

3. A pressure setting valve of a hydraulic control system for an automotive automatic transmission, said pressure setting valve being disposed within a return line connecting a pressure regulating valve to a hydraulic pressure source and dividing the return line into an upstream line connected to the line pressure regulating valve and an down stream line connected to the hydraulic pressure source, said pressure setting valve comprising:

a valve housing cavity having an upper end and a lower end, said valve housing cavity including a first port connected to the upstream line and a second port formed at a first level connected to the down stream line;

a valve spool slidably disposed within the valve cavity to selectively open the second port, said valve spool including a second port closing section and a second port opening section, which extends downward from the second port closing section and has a truncated conical-shape surface to enlarge a pressure acting area on which hydraulic fluid fed through the first port acts; and an elastic member biasing the valve spool against the upper end of the valve cavity.

* * * * *